United States Patent [19]
Elrod, Jr.

[11] Patent Number: 5,508,575
[45] Date of Patent: Apr. 16, 1996

[54] DIRECT DRIVE SERVOVALVE HAVING MAGNETICALLY LOADED BEARING

[75] Inventor: Alvon C. Elrod, Jr., Ventura, Calif.

[73] Assignee: HR Textron Inc., Valencia, Calif.

[21] Appl. No.: 187,924

[22] Filed: Jan. 27, 1994

[51] Int. Cl.[6] .................................................. H02K 21/12
[52] U.S. Cl. ............................... 310/156; 310/85; 310/90; 310/191
[58] Field of Search ..................................... 310/191, 209, 310/156, 85, 86, 104, 80, 90, 12, 45; 384/517, 518

[56] References Cited

U.S. PATENT DOCUMENTS

| | | | |
|---|---|---|---|
| 2,697,016 | 12/1954 | Spurgeon | 308/236 |
| 2,769,943 | 11/1956 | Matthews | 317/168 |
| 3,001,099 | 9/1961 | Larkey | 310/191 UX |
| 3,978,355 | 8/1976 | Hofert et al. | 310/209 |
| 4,197,474 | 4/1980 | Honigsbaum | 310/104 |
| 4,339,737 | 7/1982 | Meyers et al. | 335/272 |
| 4,347,452 | 8/1982 | Imahashi | 310/80 |
| 4,452,423 | 6/1984 | Beblavi et al. | 251/65 |
| 4,578,609 | 3/1986 | McCarty | 310/191 |
| 4,702,123 | 10/1987 | Hirao et al. | 74/526 |
| 4,793,377 | 12/1988 | Haynes . | |

FOREIGN PATENT DOCUMENTS

| | | |
|---|---|---|
| 601808 | 7/1960 | Canada . |
| 1521668 | 8/1978 | United Kingdom . |

*Primary Examiner*—R. Skudy
*Attorney, Agent, or Firm*—Robbins, Berliner & Carson

[57] ABSTRACT

A direct drive servovalve wherein a limited angle force motor is interconnected with a spool valve to convert rotary motion of the drive motor rotor to linear motion of the spool for the control of fluid from a source thereof to a load. The permanent magnets utilized in the rotor of the drive motor are positioned in such a manner that a resultant magnetic force is generated so as to urge the rotor against a bearing which supports the rotor shaft so as to substantially eliminate any radially play or sloppiness in the motor rotor.

4 Claims, 2 Drawing Sheets

5,508,575

DIRECT DRIVE SERVOVALVE HAVING MAGNETICALLY LOADED BEARING

FIELD OF THE INVENTION

This invention relates generally to direct drive servovalves and more particularly to a direct drive servovalve in which the motor rotor includes a magnetic pre-load of the bearing upon which the rotor is mounted.

BACKGROUND OF THE INVENTION

Torque motor-drive spool valves are well known in the art including those which operate through the utilization of a rotary torque motor having a drive member extending from the rotor thereof into contact with the spool valve to directly reciprocate the spool valve within a bore provided in the valve housing to thereby control the flow of fluid from a source thereof to the load in response to electrical signals applied to the drive motor. Typical of such direct drive servovalves is that illustrated in U.S. Pat. No. 4,793,377 issued Dec. 27, 1988 to Larry E. Haynes et al. The invention described and claimed herein is an improvement over the direct drive servovalve disclosed in U.S. Pat. No. 4,793,377 and therefore the disclosure of U.S. Pat. No. 4,793,377 is incorporated herein by this reference.

Other prior art known to applicant is U.S. Pat. Nos. 4,197,474; 2,769,943; 2,697,016; 4,452,423; 4,339,737; and, 4,702,123 as well as Canadian Patent 601808 issued Jul. 19, 1960 and United Kingdom Patent 1521668 issued Aug. 16, 1978. It is desirable in direct drive servovalves that the interconnection between the rotor shaft and the bearings which carry the rotor shaft be such that there is little or no back lash or radial play therein. To create a relatively stiff assembly and eliminate such radial play, it has been common to load the motor bearings by placing shims wave springs or the like in the structure to constantly preload the bearings and eliminate such radial play or sloppiness. The necessity of including such shims, wave springs or the like increases the cost of the motor as well as the cost of the manufacture and assembly of the same.

SUMMARY OF THE INVENTION

In accordance with the present invention, there is provided a force motor for use with a hydraulic control system which includes a rotor having a shaft with first and second ends, bearing means are received upon the first and second ends of the shaft. The shaft carries a permanent magnet means for generating a magnetic field extending substantially parallel with the shaft. A stator having magnetically permeable core means substantially surrounds the permanent magnets whereby the magnetic lines of force pass through and are concentrated by the core. The permanent magnets and the magnetically permeable core are relatively longitudinally offset from a central magnetic force quiescent position thereby providing a magnetically generated force continuously urging said shaft toward one of said first and second bearing means.

DESCRIPTION OF THE ILLUSTRATIVE EMBODIMENT

Figure 1:
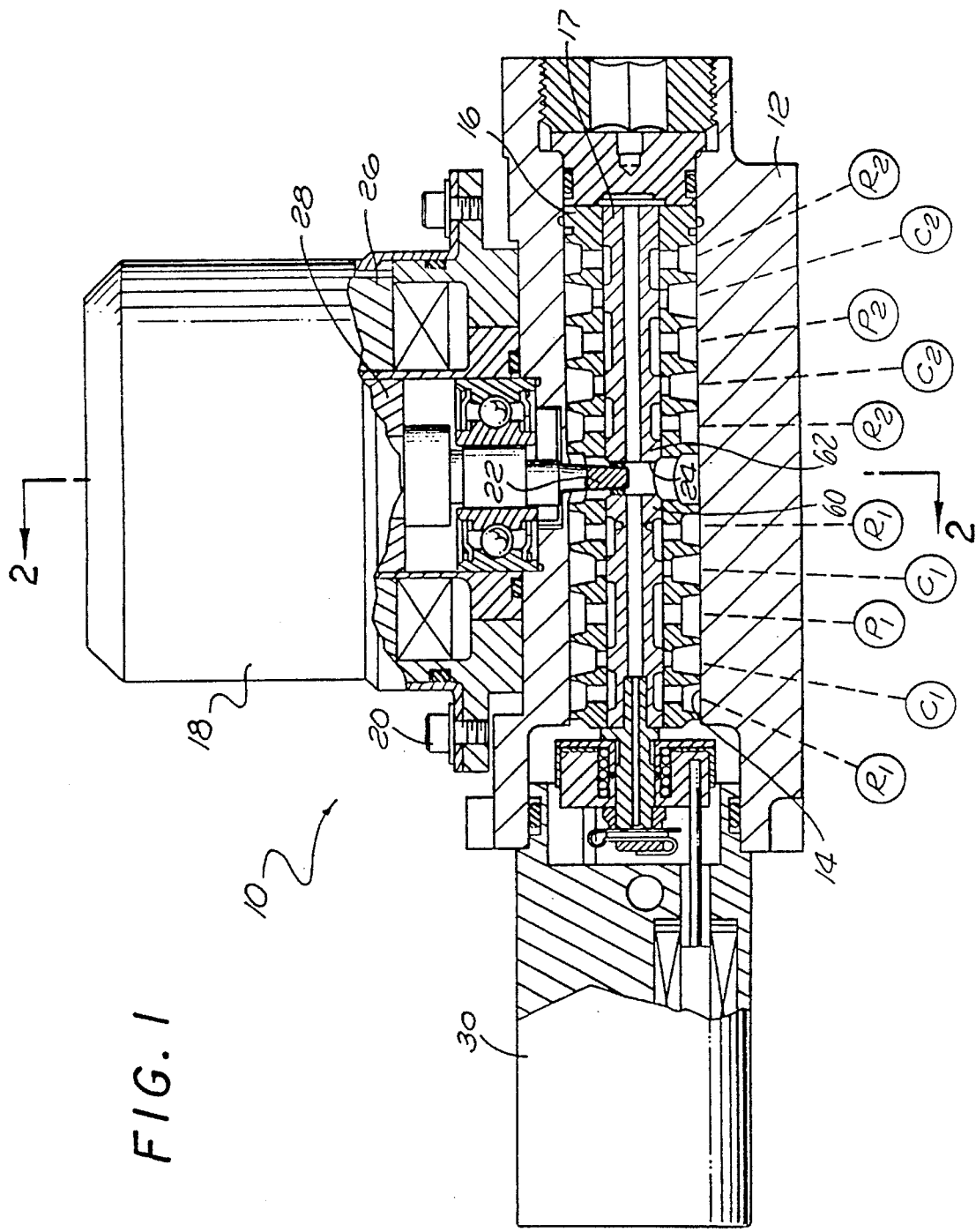
FIG. 1 is a longitudinal cross sectional view of a direct drive servovalve constructed in accordance with the principals of the present invention.
Figure 2:
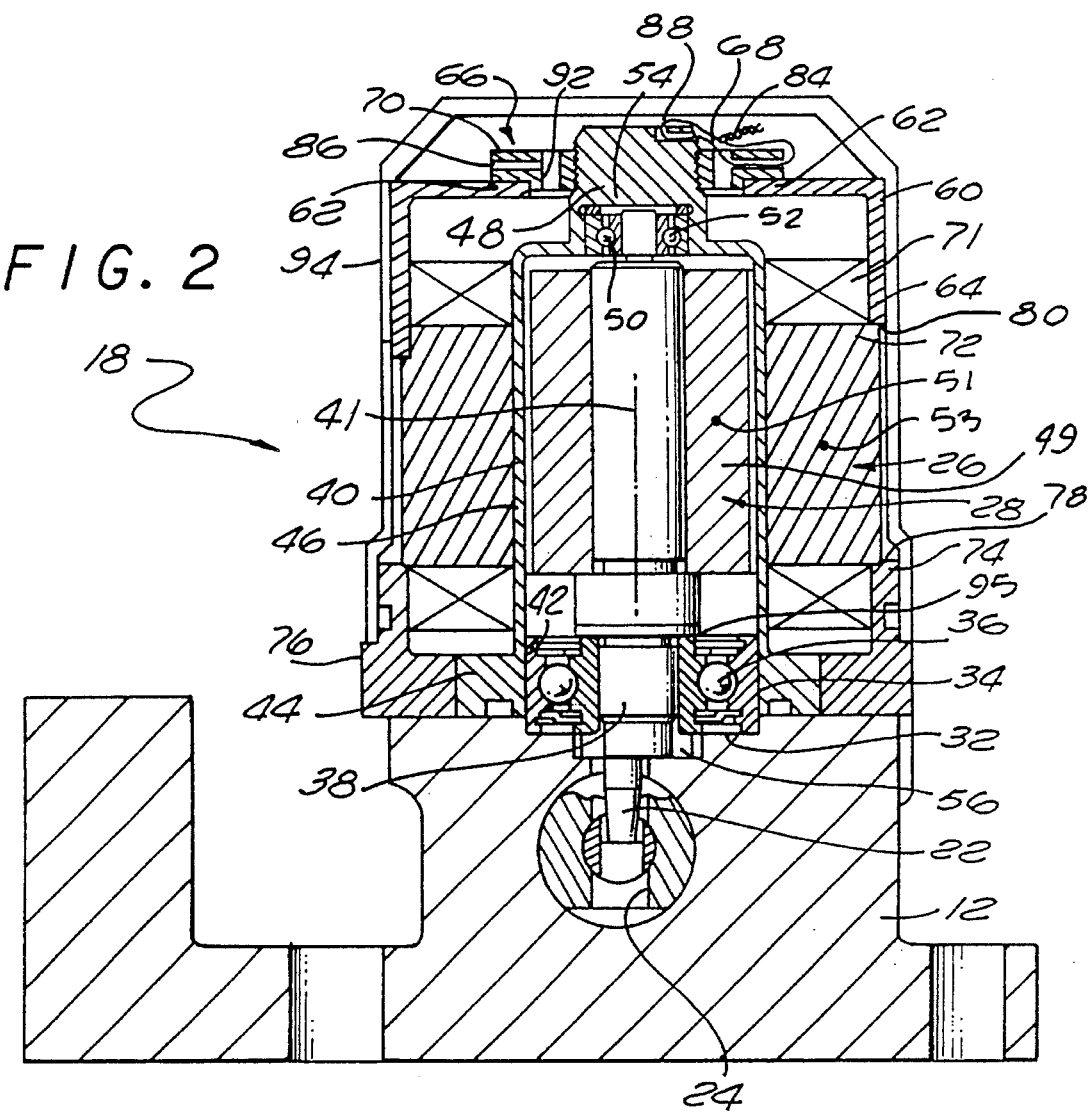
FIG. 2 is a cross sectional view taken about the line 2—2 of FIG. 1.
Figure 3:
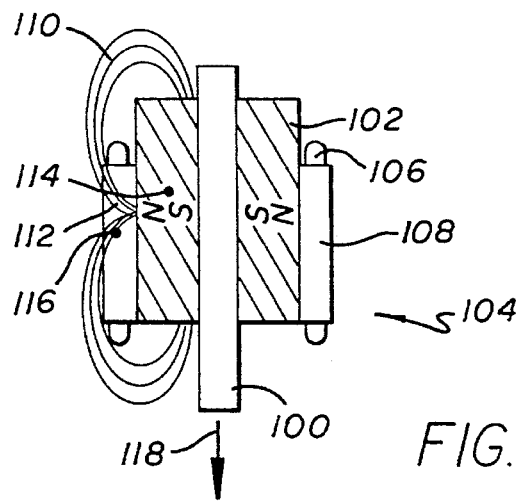
FIG. 3 is a schematic representation illustrating the generation of the magnetic force used to provide the magnetic pre-load in accordance with the principles of the present invention.

By reference to FIGS. 1–3 there is illustrated a direct drive servovalve having a force motor which is constructed in accordance with the principles of the present invention. As is shown in FIG. 3 to which reference is hereby made, a shaft 100 carrying a permanent magnet means 102 is positioned within a stator 104 which carries field windings 106. The stator 104 includes a laminate stack core means which is constructed of magnetically permeable material such as iron or iron containing alloys. The laminate stack magnetically permeable core means 108 substantially surrounds the permanent magnet means 102. In one typical embodiment the permanent magnet means 102 is preferably constructed of cast rare earth materials as is well known in the prior art and is polarized as illustrated in FIG. 3 with the North pole on the outer surface and the South pole on the inner surface thereof when considering the particular structure illustrated. The polarity may be reversed and there may be any number of rotor poles as desired for the particular application under consideration. As is illustrated in FIG. 3, magnetic lines of force 110 emanate from the North pole of the permanent magnet means 102 and re-enter the magnet at the South pole as is well known to those skilled in the art. Since the magnetically permeable core means 108 is positioned immediately adjacent the outer periphery of the permanent magnet means 102, the magnetic lines of force are concentrated thereby as is particularly shown at 112 in FIG. 3. The permanent magnet means has a central position shown at 114 while the magnetically permeable core means has a central position as shown at 116. In the absence of any restraints, the shaft 100 containing the permanent magnet means 102 would move downwardly as shown by the arrow 118 so that the permanent magnet means 102 and the magnetically permeable core means 108 would be positioned in a centralized magnetic force quiescent position. However, if a restraint is placed to prevent the movement of the shaft 100 carrying the permanent magnet means 102, then the relative displacement of the permanent magnet means 102 with respect to the magnetically permeable core means 108 generates a continuous downwardly directed force 118. It is this downwardly directed force 118 generated by the magnetic offset which is utilized to pre-load the bearing in accordance with the principles of the present invention. It should be understood by those skilled in the art that by displacing the center 114 of the permanent magnet means 102 below the center 116 of the magnetically permeable core means 108 (as viewed in FIG. 3) the continuously generated magnetic force would be in the opposite direction from that illustrated by the arrow 118 in FIG. 3.

By reference now more particularly to FIG. 1, there is shown a direct drive valve 10 constructed in accordance with the principles of the present invention. As is therein shown, a valve housing 12 includes a bore 14 within which there is positioned a sleeve 16. A reciprocally moveable spool valve 17 is mounted within the sleeve 16. A servovalve torque motor 18 is affixed to the valve housing 12 by means of bolts or other fasteners 20 so that a drive member 22 engages an opening 24 in the spool valve 17 to move the spool valve 17 in response to the electrical signals applied to the motor means 18, as is well known in the art.

As is illustrated in FIGS. 1 and 2, the motor means is a rotary motor including a stator 26 and a rotor 28 as is well known in the art.

As is shown particularly in FIG. 1, the direct drive servovalve constructed in accordance with the principles of the present invention includes appropriate ports for the control of fluid from dual sources P1 and P2 thereof under pressure to, for example, a dual tandem actuator (not shown) and from the actuator to return through the utilization of dual cylinder and return ports. Such is indicated by the designations P1, R1 and C1 as well as P2, R2 and C2. The valve assembly 10 may also include a Linear Variable Differential Transformer (LVDT) 30 as is well known in the prior art. The construction of the rotary direct drive servovalve as illustrated in FIGS. 1 and 2 and thus far described is well known in the prior art and additional detail with regard thereto is not believed to be necessary.

As is shown more particularly in FIG. 2, a rotor 28 is mounted within an isolation tube 46 by bearing means 36 and 52 each of which has an inner race and an outer race with bearings trapped therebetween. The inner races are secured to the shaft 40 and rotate therewith while the outer races are immovably secured to the isolation tube 46. As is seen, the valve housing 12 defines a first recess 32 which receives the outer surface 34 of the bearing means 36 mounted upon one end 38 of the rotor shaft 40 of the motor means 18. The recess 32 conforms to the outer surface 34 cross-sectional configuration of the bearing means 36 and has a depth which is substantially less than the longitudinal length of the outer surface 34 of the bearing means 36. As a result and as is clearly illustrated in FIGS. 1 and 2, when the bearing is received within the recess 32, a substantial portion of the outer surface 34 thereof protrudes from the valve housing 12.

As a result of the longitudinal dimension of the outer surface 34 of the bearing means 36, it can be seen from FIGS. 1 and 2 that the bearing is mutually received within a second recess 42 defined by the lower portion 44 of the isolation tube 46. The isolation tube 46 surrounds the rotor 28 of the motor means 18 and isolates hydraulic fluid from the stator 26 of the motor means 18.

The isolation tube 46 also includes an upper closed end portion 48 thereof which defines a third recess 50 which receives a second bearing means 52. The bearing means 36 and 52 are utilized to support the rotor shaft 40 in a properly aligned position within the isolation tube 46 and stator 26. Such alignment is obtained by inserting the end 54 of the rotor shaft 40 by way of an interference fit into the inner race of the bearing means 52. The outer race of the bearing means 52 is then inserted by means of a location slip fit between the third recess 50 and the outer race of the bearing means 52. The bearing means 36 is then inserted by means of an interference fit between the outer surface 34 of the bearing means 36 and the second recess 42 inner surface as provided in the lower portion 44 of the isolation tube 46. A locational slip fit is provided between the lower portion 38 of the rotor shaft 40 and the inner race of the bearing means 36. Subsequent to this assembly, which now provides essentially a solid structure between the isolation tube 46 and the rotor 28, the assembly is inserted into the first recess 32 by a locational slip fit between it and the outer surface 34 of the bearing means 36. It can, therefore, be seen by those skilled in the art that the outer surface 34 of the bearing means 36 is utilized as the surface with respect to which the motor assembly 18 and the valve housing 12 are aligned. By then appropriately aligning the sleeve 16 within the valve housing 12 and positioning the spool valve 17 therein, it can be seen that the longitudinal axis 41 of the rotor shaft 40, the drive member 22, the opening 24 and the opening 56 through which the drive member extends are axially aligned when viewed in FIG. 1 and when the spool valve 17 is in its null position.

As is seen particularly in FIG. 2 the rotor shaft 40 carries a permanent magnet means 49 which is secured to it. The permanent magnet means 49 is preferrably constructed of cast rare earth magnetic materials as is well known to those skilled in the art and may have any number of poles which is desired depending upon the particular application to which the force motor is to be put. The permanent magnet means 49 has a magnetic center substantially at 51 and is polarized in such a manner that magnetic lines of force emanate radially and axially outwardly therefrom. Typically the magnetic North and South poles are radially disposed with respect to the longitudinal axis 41 of the rotor shaft 40. The stator 26 comprises a pole piece 72 which is typically a laminate structure of magnetically permeable material carrying field windings 71 disposed so as to substantially surround the permanent magnet means 49. The pole piece 72 has a center as shown substantially at 53. It can therefore be seen that there is a relative magnetic offset between the magnetic center 51 of the permanent magnet means 49 and the magnetically permeable pole piece 72. As above described in conjunction with FIG. 3 as the magnetic lines of force emanate from the permanent magnet means 49 they are concentrated by the magnetically permeable pole piece 72 and as a result of the offset generate a magnetic force in a downward direction as viewed in FIG. 2 which constantly urges the rotor 28 such that the shaft shoulder 95 contacts and pushes in a downward direction against the inner race of the bearing means 36 thereby magnetically pre-loading the bearing means 36 in a continuous fashion.

As is illustrated, the stator 26 is secured in position by a retainer assembly which in turn is secured to the closed upper end 48 of the isolation tube 46. As is shown, the retainer 60 includes an annular member 62 having a downwardly depending skirt 64. A retainer ring 66 is threadably secured to the outer surface 68 of the closed upper end 48 of the isolation tube 46. As is shown, the retainer ring 66 includes an outwardly extending flange 70 which overlaps the annular member 62 in such a manner that as the retainer ring 66 is threaded onto the outer surface 68, the flange applies downwardly exerted clamping pressure against the pole piece 72 of the stator 26. There is also provided an upstanding wall 74 which is part of the base 76 of the isolation tube 46. The wall 74 defines a shoulder 78 upon which the pole piece 72 rests.

As a security measure, a lock wire 84 is threaded through appropriate openings provided in the retainer ring 66 and the closed upper end 48 of the isolation tube 46 to preclude loosening inadvertently of the retaining ring 66. To accommodate the locking wire, openings 86 are provided in the flange 70 of the retainer ring 66 while openings 88 are provided in the upper closed end 48 of the isolation tube 46. In addition, to secure the locking ring, threads are formed on the inner surface thereof which are threadably received by the threads formed on the outer surface of the upper portion 48 of the isolation tube 46. Openings 92 are provided in the locking ring to receive an appropriate tool for properly torquing the locking ring in place so that the flange 70 clamps the stator 26 between the periphery 80 of the retainer 60 and the shoulder 78 of the wall 74. A motor housing 94 is secured in place by the fasteners 20 to environmentally protect the motor 18. As will be evident to those skilled in the art, the motor housing 94 does not function in any fashion to clamp or otherwise secure the stator or any other portion of the drive motor.

There has thus been disclosed an embodiment of a direct drive servovalve having a permanent magnet means which is offset magnetically centrally from a magnetically permeable member such as a pole piece for the motor stator to thereby provide a continuous magnetic pre-load of a bearing means carrying the motor rotor. It should be understood by those skilled in the art that although the specific illustration and description has been given with respect to a direct drive servovalve that the force motor constructed in accordance with the principles of the present invention may be utilized in any type of application desired.

What is claimed is:

1. A force motor having a longitudinal axis for use with a hydraulic control system comprising:

(a) an isolation tube;

b) a rotor received within said isolation tube and including a shaft having first and second ends and an axis coincident with said longitudinal axis;

(c) first and second bearing means receiving said shaft adjacent said first and second ends respectively;

(d) each of said first and second bearing means including bearings trapped between an inner race and an outer race, said first and second bearing means inner race being disposed upon and secured to said shaft and said first and second bearing means outer race being non-moveably received within said isolation tube;

(e) permanent magnet means carried by said shaft for generating a magnetic field having lines of magnetic force extending parallel with said shaft axis;

(f) a stator means including field windings disposed upon magnetically permeable core means having a length along said longitudinal axis, said magnetically permeable core means substantially surrounding said isolation tube and permanent magnet means whereby said lines of magnetic force pass through and are concentrated by said magnetically permeable core means;

(g) said permanent magnet means and said magnetically permeable core means being relatively longitudinally offset from a central magnetic force quiescent position thereby providing a magnetically generated force continuously urging said shaft toward one of said first and second bearing means; and (h) said first and second bearing means inner races applying a force to said bearings thereby preloading said first and second bearing means to eliminate radial play and sloppiness from said force motor.

2. A force motor as defined in claim 1 wherein said permanent magnet means has a length along said longitudinal axis which is greater than said length of said magnetically permeable core means.

3. A force motor as defined in claim 2 wherein said greater length of said permanent magnet means extends toward said second bearing means thereby continuously urging said rotor shaft toward said first bearing means.

4. A force motor as defined in claim 2 wherein said shaft includes a shoulder positioned to bear against one of said first and second bearing means inner race.

\* \* \* \* \*